No. 855,766. PATENTED JUNE 4, 1907.
R. GERLACH.
SHEARING MACHINE.
APPLICATION FILED JAN. 11, 1906.
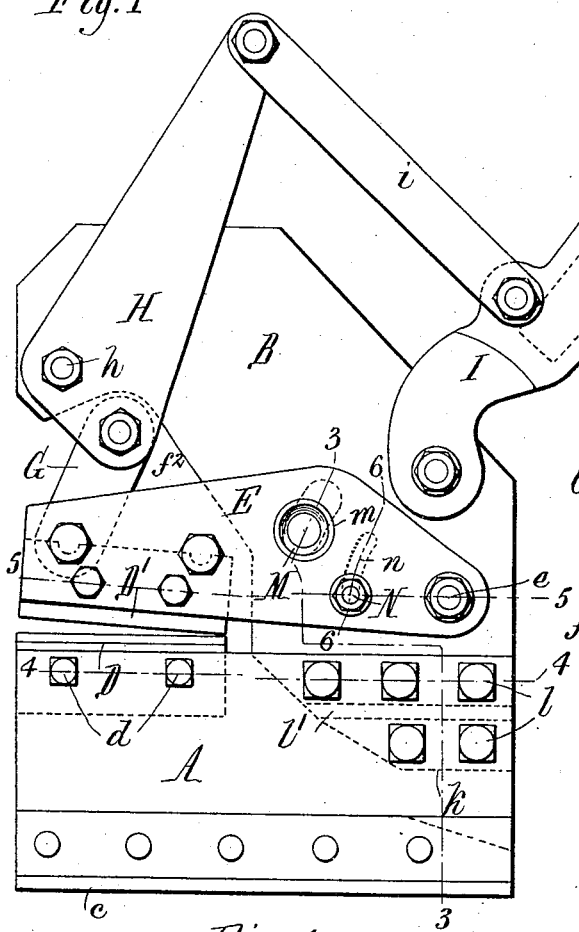
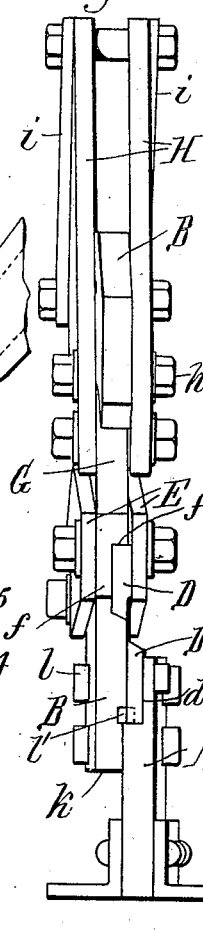
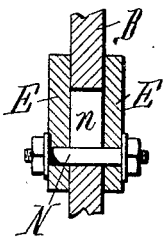
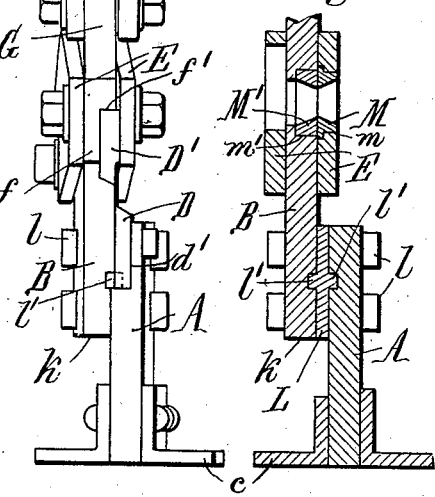
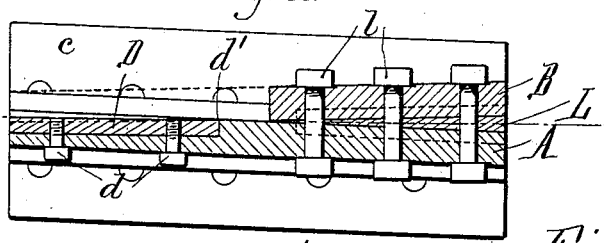
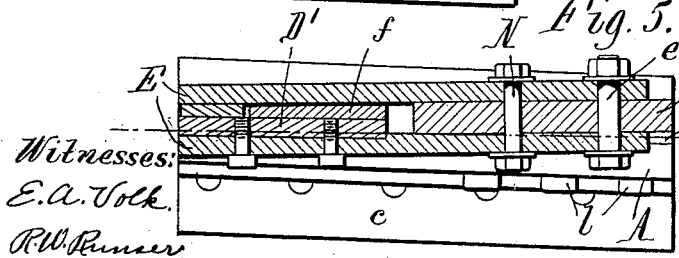

UNITED STATES PATENT OFFICE.

ROBERT GERLACH, OF BUFFALO, NEW YORK, ASSIGNOR TO BUFFALO FORGE COMPANY, OF BUFFALO, NEW YORK.

SHEARING-MACHINE.

No. 855,766.      Specification of Letters Patent.      Patented June 4, 1907.

Application filed January 11, 1906. Serial No. 295,539.

*To all whom it may concern:*

Be it known that I, ROBERT GERLACH, a citizen of the United States, residing at Buffalo, in the county of Erie and State of New York, have invented a new and useful Improvement in Shearing-Machines, of which the following is a specification.

This invention relates more particularly to continuous shearing machines or shearing machines of that kind having relatively short shear blades in which a cut of greater length than the blades is made by a succession of short cuts produced by successive operations of the shears. The hand operated machines employed in small shops for shearing relatively wide sheets or plates of metal are of this type.

The principal objects of this invention are to produce a very powerful and strong, but light and compact, machine of this character; and to so construct the machine that there will be a clearance between the sheared edges of the plate or sheet being cut and the standard or frame of the machine to prevent the sheet or plate from binding thereon, thus greatly relieving the work of pushing the sheet or plate along as the cut is lengthened and enabling such slight lateral shifting of the sheet or plate as may be required to maintain the proper line of cut.

In the accompanying drawings: Figure 1 is a side elevation of a shearing machine embodying the invention: Fig. 2 is a front elevation thereof. Fig. 3 is a fragmentary vertical cross section thereof in line 3—3, Fig. 1. Fig. 4 is a horizontal cross section thereof in line 4—4, Fig. 1. Fig. 5 is a horizontal cross section thereof in line 5—5, Fig. 1. Fig. 6 is a fragmentary cross section in line 6—6, Fig. 1.

Like letters of reference refer to like parts in the several figures.

The shearing machine comprises, as usual, a stationary frame or standard, a shear blade which is mounted on the standard, a movable shear blade which is carried by a jaw or lever movably mounted on the standard, and operating means for the movable blade. In order to produce a continuous cut in a sheet or plate considerably wider than the length of blades, it is necessary to offset the upper part of the standard relative to the lower part to locate the two parts at opposite sides of the vertical plane of the cutting edges of the shear blades, so that the portion of the plate or sheet at one side of the cut can pass rearwardly over the top edge of the lower part of the standard while the other portion of the plate or sheet can pass under the bottom edge of the upper portion of the standard. The cast metal standards or frames heretofore employed in these machines must be very thick to withstand the severe strains incident to shearing a relatively thick metal plate and the machines are therefore cumbersome and heavy and awkward to use.

According to this invention the standard is made of lower and upper flat or plain plates A and B of steel or wrought iron, such as boiler plate or armor plate, arranged in different vertical planes with their meeting portions side by side or overlapped and rigidly secured together. The manner of connecting the standard plates will be described later. The standard is provided with a base $c$ of any suitable sort adapted to support the machine in upright position, the base in the machine shown being formed by the laterally projecting flanges of angle bars secured to the opposite sides of the lower plate of the standard.

D and D' represent respectively the blades of the shears. One blade, D, is secured to the upper front portion of the lower standard plate, being preferably secured by bolts $d$ in a seat $d'$ in the standard plate, with its cutting edge in a vertical plane midway between the side faces of the upper and lower plates of the standard. The movable blade D' is secured to a lever or jaw consisting, preferably, of two flat plates or bars E arranged on opposite sides of the upper standard plate, against the opposite faces thereof, and fulcrumed thereto by a pivot bolt or pin $e$ connecting the lever plates and passing through a bearing hole in the standard plate. The movable blade is bolted between the bars of the lever, a spacing block $f$ being also preferably bolted between the lever bars and provided with a shoulder $f'$ against which the blade bears to strengthen the connection. The movable shear blade is thus located in the plane of the upper plate of the standard and the latter is cut away or recessed over the stationary blade at $f^2$ to provide the necessary space for the movements of the movable blade.

Any suitable operating means for the movable blade lever or jaw E could be employed. In the machine shown the lever is connected by a toggle link G to a lever H which is fulcrumed at $h$ on the overhanging portion of the upper standard plate, and preferably consists of separate connected bars arranged at opposite sides of the standard plate, and this lever H is connected by links $i$ to a hand lever I fulcrumed on the standard.

When it is desired to produce a cut longer than the shear blades, after each cut by the blades the sheet or plate is pushed rearwardly to place the next part between the blades. The portion of the sheet at one side of the cut passes rearwardly over the top edge of the lower standard plate, and the portion of the sheet at the other side of the cut will be deflected downwardly and pass beneath the lower edge $k$ of the upper standard plate, which edge is inclined rearwardly so as not to obstruct the movement of the sheet or plate.

If the upper and lower plates A and B of the standard were parallel, with the meeting faces of their overlapping connecting portions contacting in the same vertical plane with the cutting edges of the blades, the portions of the sheet or plate at the opposite sides of the cut being made would frictionally engage one face of the upper and lower standard plates, and would thus make it difficult to force the plate rearwardly in continuing the cut. To prevent such contact of the sheet with the standard or give clearance between the work and the standard, the upper and lower plates thereof are not parallel but are arranged in planes diverging from each other rearwardly from the shear blades. This is effected as follows: A steel wedge or tapering key plate L is placed between the overlapping portions of the standard plates, and the latter and the wedge are rigidly fastened together by bolts $l$ passing through holes therein. The wedge is provided at opposite sides with projecting longitudinal keys or tongues $l'$ which fit tightly in corresponding ways or grooves cut in the inner faces of the standard plates, see Fig. 3. The wedge being clamped firmly between the standard plates and having the keys interlocking in the grooves in the standard plates prevents any possible shifting of the standard plates relative to each other or to the wedge, and thus relieves the connecting bolts from shearing stresses in the operation of the machine. The keys being of steel and having such relatively great area of contact with the standard plates cannot be sheared or stripped off under the strains to which the machine is subject. A very strong and rigid standard is produced in this manner, the separate plates connected in this manner, the standard having decidedly greater strength than a cast metal standard which is several times its thickness and much heavier. Aside from its greater strength and less weight the plate standard is a marked improvement over the cast standard in that the levers can be made of duplicate bars at opposite sides of the standard without making the machine bulky and necessitating long pivots and connecting bolts which would be liable to bend under strain.

As shown in Fig. 4, the cutting edges of the shear blades lie in a vertical plane coincident with the vertical central plane of the wedge L. The inner or adjacent faces of the upper and lower standard plates therefore recede from the plane of the cut in a rearward direction and the cut edges of the sheet or plate being sheared will not contact therewith. The sheet can, therefore, be advanced to lengthen the cut with little exertion, and furthermore a limited lateral play of the work is permitted which enables the operative to shift the sheet as may be necessary to maintain the true line of the cut. It will be noticed from Fig. 4 that the standard plates diverge rearwardly from a point about at the rear end of the blades. This causes the front portion of the upper standard plate to overhang the front of the lower plate somewhat in a lateral direction and throws the lever for the movable blade and its operating lever more nearly directly over the lower blade, so that the power is applied nearly in the vertical plane of the cutting edges of the blades and the twisting strains on the movable blade are materially reduced. The wedge plate with the ribs or tongues is preferable because it causes the described angularity of the standard plates as well as relieving the connecting bolts from shear, but a standard composed of the offset upper and lower plates bolted together with an interposed key of other form interlocking with parts on the standard plates only for preventing shear on the bolts would be desirable.

The machine shown is equipped in addition to the shears described, with a rod or bar cutter formed by co-operating cutting blades or rings M M', Figs. 1 and 3, secured in holes $m\ m'$, respectively, in one bar of the lever E and the standard plate B. The cutting rings are fitted tightly in their holes and the holes are shouldered or of larger diameter at their inner ends than at their outer ends, to hold the blades or rings from displacement outwardly. The rings contact at their inner ends and so cannot work out of their retaining holes. The contacting ends of the rings have shearing edges and are adapted to cut a rod or bar inserted through the holes $m\ m'$ in the standard and lever E. The opposite bars of the lever E are prevented from spreading and thus defeating a proper operation of the bar or rod cutter by a bolt N, Figs. 1 and 6, which connects the lever bars and passes through a slot n in the standard. This rod cutter is not an essential feature of the machine, but is a desirable adjunct to the shears D D′, for if the latter were used for cutting rods and bars they would be dulled at some points more than at others and be thereby rendered unfit for shearing sheets or plates.

I claim as my invention:

1. In a shearing machine, the combination of a standard composed of separate plates having overlapping connected portions, and a key located between said overlapping portions of the plates and interlocking therewith, co-operating shear blades, one of which is mounted on one of said standard plates, and a lever or jaw mounted on said other standard plate and carrying said other shear blade, substantially as set forth.

2. In a shearing machine, the combination of a standard composed of separate plates having overlapping portions, a thin key plate located between and substantially coextensive with said overlapping portions of the plates and having parts at opposite sides interlocking with said standard plates, and bolts connecting said standard plates and key plate, co-operating shear blades, one of which is mounted on one of said standard plates, and a lever or jaw mounted on said other standard plate and carrying said other shear blade, substantially as set forth.

3. In a shearing machine, the combination of a standard composed of separate plates having overlapping connected portions, and a wedge-shaped plate secured between the connected portions of the standard plates whereby they are held in an angular relation, co-operating shear blades, one of which is mounted on one of said standard plates, and a lever or jaw mounted on said other standard plate and carrying said other shear blade, substantially as set forth.

4. In a shearing machine, the combination of a standard composed of separate plates having overlapping connected portions, and a wedge-shaped plate secured between the connected portions of the standard plates, whereby they are held in an angular relation, said wedge plate and standard plate having interlocking parts, co-operating shear blades, one of which is mounted on one of said standard plates, and a lever or jaw mounted on said other standard plate and carrying said other shear blade, substantially as set forth.

5. In a shearing machine, the combination of a standard composed of separate plates having overlapping connected portions, and a wedge-shaped plate secured between the connected portions of the standard plates whereby they are held in an angular relation, shear blades arranged with their cutting edges in the plane of the center of said wedge plate, one of said blades being mounted on one of said standard plates, and a lever or jaw mounted on said other standard plate and carrying said other blade, substantially as set forth.

6. In a shearing machine, the combination of a standard composed of separate plates rigidly secured together and arranged in planes at an angle to each other, a shear blade mounted on one of said standard plates, a jaw movably mounted on said other standard plate, and a co-operating shear blade mounted on said jaw, substantially as set forth.

7. In a shearing machine, the combination of a standard composed of separate plates having portions overlapping side by side and secured together and other portions arranged substantially opposite each other edgewise but in planes at an angle to each other, a shear blade mounted on one of said standard plates, a jaw movably mounted on said other standard plate, and a shear blade carried by said jaw, substantially as set forth.

Witness my hand, this 8th day of January, 1906.

ROBERT GERLACH.

Witnesses:
WM. L. FOX,
C. L. LEIBERR.